(12) United States Patent
Scharf et al.

(10) Patent No.: US 9,149,004 B2
(45) Date of Patent: Oct. 6, 2015

(54) BALER AND METHOD FOR OPERATING A BALER

(75) Inventors: Thorsten Scharf, Orscholz (DE); Ulrich Hesselmann, Perl (DE); Cyrille Arnould, Montoy-Flanville (FR); Julien Waechter, Failly (FR)

(73) Assignee: USINES CLAAS FRANCE S.A.S., Metz (FR)

( * ) Notice: Subject to any disclaimer, the term of this patent is extended or adjusted under 35 U.S.C. 154(b) by 465 days.

(21) Appl. No.: 13/540,683

(22) Filed: Jul. 3, 2012

(65) Prior Publication Data

US 2013/0014652 A1   Jan. 17, 2013

(30) Foreign Application Priority Data

Jul. 13, 2011   (EP) ..................................... 11005707

(51) Int. Cl.
   *A01F 15/08*   (2006.01)
   *A01F 15/14*   (2006.01)
(52) U.S. Cl.
   CPC ........... *A01F 15/148* (2013.01); *A01F 15/0825* (2013.01)

(58) Field of Classification Search
   CPC .... A01F 15/08; A01F 15/0825; A01F 15/148
   USPC ........................................ 100/3, 4, 8; 56/341
   See application file for complete search history.

(56) References Cited

U.S. PATENT DOCUMENTS

| 4,354,429 | A | * | 10/1982 | Boldenow et al. | 100/5 |
| 4,624,179 | A | * | 11/1986 | Yves et al. | 100/4 |
| 4,765,235 | A | * | 8/1988 | Schrag et al. | 100/3 |
| 2003/0028289 | A1 | * | 2/2003 | Daniel et al. | 701/1 |
| 2004/0006402 | A1 | * | 1/2004 | Stamps et al. | 700/90 |

* cited by examiner

*Primary Examiner* — Jimmy T Nguyen
(74) *Attorney, Agent, or Firm* — Michael J. Striker

(57) ABSTRACT

A method for operating a baler with a pressing chamber which serves for the pressing of a straw-like crop includes compacting the crop using an adjustable pressing pressure and binding the crop through a holding material. The pressing pressure is limited to a maximum value and controlled through a control circuit. A control circuit reference variable is a load variable of the holding material. The load variable is adjustable and is smaller than or equal to the maximum value.

7 Claims, 2 Drawing Sheets

BALER AND METHOD FOR OPERATING A BALER

CROSS-REFERENCE TO RELATED APPLICATION

The invention described and claimed hereinbelow is also described in European Patent Application EP 11005707.2, filed on Jul. 13, 2011. This European Patent Application, whose subject matter is incorporated here by reference, provides the basis for a claim of priority of invention under 35 U.S.C. 119(a)-(d).

BACKGROUND OF THE INVENTION

The present invention relates to a method for operating a baler, particularly a round baler or a square baler, with a pressing chamber serving for the pressing of a straw-like crop. The crop is compacted by means of an adjustable pressing pressure and bound through holding material.

The invention further relates to a baler, particularly a round baler or square baler. The baler has a pressing compartment serving for the pressing of a straw-like crop for compacting the crop by means of an adjustable pressing pressure and for binding the compacted crop.

Both round balers as well as square balers are known and available in the market. In the known balers, the pressing pressure in the pressing chamber is adjustable and thus also the pressed density of the crop. Despite the adjustable pressing pressure, however, it is quite possible with the known balers that the pressing pressure is not matched to the material properties, particularly the tensile strength of the binding twine. Hence, it is possible that the pressing pressure is set too high and the tensile strength of the binding twine does not withstand the pressed crop and tears. It is likewise possible that the pressing pressure is set too low and consequently, the efficiency of the binding twine is not utilised.

Further more, with the known high-performance balers present in the market, it is extremely difficult and time-consuming for users of same to match the performance of the baler to the efficiency of the binding twine. With the balers available in the market today, matching the performance of the baler to the efficiency of the binding twine can only be accomplished through testing and trial during harvesting operation.

SUMMARY OF THE INVENTION

The present invention overcomes the shortcomings of conventional balers, such as those mentioned above.

In an embodiment, the invention, the invention provides a method for operating a baler, preferably a high-pressure baler, such as a square baler or the like with a pressing chamber serving for the pressing of a straw-like crop. The method includes compacting the straw-like crop in the pressing chamber by means of an adjustable pressing pressure. The pressed crop is bound through holding material. The pressing pressure is limited to a maximum value and controlled through a control circuit whose reference variable is a load variable of the holding material, which is adjustable and smaller than or equal to the maximum value.

In another embodiment, the invention provides a high-pressure baler, particularly a round baler and/or square baler. The baler includes a pressing chamber serving for the pressing of a straw-like crop for compacting the crop by means of an adjustable pressing pressure and for binding the compacted crop. A control circuit is included for controlling the pressing pressure and an operating unit for setting a load variable of the holding material. The load variable of the holding material is used as input value for comparison with a threshold value in an evaluation unit, whose output value is fed to the control circuit as a reference variable. The reference variable maximally corresponds to the threshold value, which reflects a baler-specific maximum load.

Through the invention, the pressing pressure on the one hand is optimised by means of the control circuit to the maximum load capacity, particularly the tensile strength of the holding material (for example, binding twine), so that an overloading of the holding material and thus its damage is securely avoided.

The invention also provides a degree of utilisation for the high-performance baler, particularly of a square baler or round baler, which ensures an optimised compacting of the straw-like crop. Despite the optimised utilisation of the holding material, particularly of the binding twine in conjunction with an optimised pressed density of the crop, the invention further provides that the baler, particularly its mechanical components, are not damaged during a pressing operation. This is advantageous because it can occur during pressing operation that an extremely high-strength holding material for a baler type is erroneously used whose limit load, particularly its tensile strength, allows pressing pressures which are above the limit load of the baler, particularly of mechanical components of the baler.

Preferably the pressing pressure in a first predetermined pressing phase is reduced to a value that is smaller than the maximum value. Through such a reduction of the pressing pressure by an adjustable safety factor, damaging of the holding material, particularly of the binding twine, and damaging of the baler, are avoided. Concurrently, starting out from this pressing pressure as reference variable for the control circuit, a pressing pressure that is matched to the respective holding means (particularly of the binding twine), is reliably set by the control circuit in an optimised manner.

In another embodiment, the invention provides that the maximum value is a baler-specific code number. This baler-specific code number can, for example, be the load limit of sensitive mechanical components of the high-performance baler. Even the use of a holding means, particularly of a highly tear-resistant binding twine, the load limit of which would result in a pressing pressure that could damage the baler as a consequence, is harmless for such a baler. This is because the invention assures that the reference variable of the control circuit remains behind the maximum load, particularly of the tensile strength of the binding twine, and can maximally assume the permissible maximum load of sensitive mechanical components of the baler.

The maximum value for the maximum load in particular is the tensile strength of the holding material, particularly of a binding twine. With balers in mechanical terms of a very sturdy construction, with which the maximum load of sensitive mechanical components clearly lies above the maximum load of the holding material, an optimised pressed density of the straw-like crop in the pressing chamber can be achieved in this manner.

Preferably, the maximum value of the baler and/or maximum value of the holding material is stored in an operating terminal, for example, an operating terminal with display that can be accessed by the user of the baler and adjusted for the respective operation of the baler on the user terminal.

The holding material (e.g., binding twine) can be specifically subjected to a load in a particular manner where the invention provides that the maximum value of the holding material is its maximum tensile strength. Preferably, a plurality of different holding materials with their specific characteristic data, particularly their tensile strength, are stored in the operating terminal from which in each case a holding material can be selected and preferably saved.

In another embodiment, the invention provides that holding material is binding twine. Preferably, at least one force which particularly occurs on the binding twine and is detected through at least one sensor serves as controlling quantity for the control circuit. Through such a measure, the degree of utilisation of the holding material, particularly of the binding twine, is reliably determined and thus an optimised utilisation of the holding material achieved.

In yet another embodiment, the invention provides that the force that occurs on the binding twine is detected on a knotting device of the baler, particularly of a square baler, particularly on its knotter beak or on its knotter frame, through the at least one sensor. Through such a determination of the binding twine load, the latter is determined at a location of the baler that is particularly critical for the loadability of the binding twine. If this critical loadability influences the control circuit as controlling quantity, a tearing of the binding twine is safely avoided in a particularly simple manner.

Preferably, the control circuit comprises a PI-regulator or a PID-regulator.

In another embodiment, the invention provides that the control circuit includes a controlling section comprising a time-delay element of the first order or a non-oscillatable time-delay element of the second order.

In a baler according to the invention (e.g., a round baler or a square baler), with a pressing compartment for pressing and compacting a straw-like crop by means of an adjustable pressing pressure and for binding the compacted crop, includes a control circuit for controlling the pressing pressure and an operating unit for setting a load variable of the holding material the baling press with an optimised degree of utilisation, particularly an optimised twine utilisation. This feature safely protects the baler from damages, particularly of its sensitive mechanical components, wherein the baler is operated such that the load variable of the holding material is provided as input value for comparison with a threshold value and fed to an evaluation unit, the output value of which is fed to the control circuit as reference variable which maximally corresponds to the threshold value, which reflects a maximum load of the baler.

Such a maximum load for the baler can be both the maximum load of the holding means employed (particularly of a binding twine), or the maximum load of baler-specific components (particularly of sensitive mechanical components) or a combination of the load limit of the mechanical baler components (particularly of the mechanical square baler components) and the maximum load of the holding means used (particularly of the binding twine). Preferably, the holding material is embodied as binding twine.

Most preferably, the maximum load of the baler is the maximum tensile strength of the binding twine or the deformation resistance of one or a plurality of mechanical components of the baler or a combination of these load quantities.

In an embodiment, at least one force sensor is provided, which is assigned to a knotter device (preferably to its knotter beak or its knotter frame) in order to detect the force that occurs on the binding twine. Preferably, a sensor for detecting the pressing pressure is provided, which is preferably arranged on the pressing piston of the square baler.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
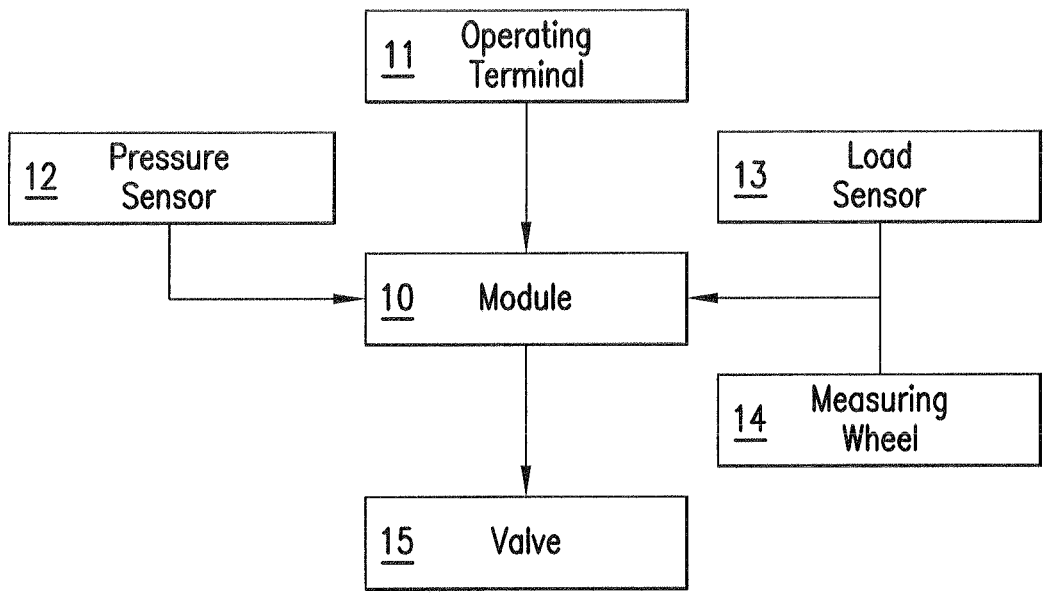
FIG. 1 is a basic block diagram representation a first embodiment of a method of the invention.

According to FIG. 1, a module 10 comprises a control circuit, which is preferably formed out of electronic components. in the exemplary embodiment shown, module 10 comprises a PID-regulator that includes a non-oscillatable time-delay element of the second order serving as a controlling section. In signal contact with the module 10 is an operating terminal 11 of a high-performance baler which in this context is not described in more detail. The baler, for example, may be a square baler. The operating terminal 11 can be installed in a traction vehicle of the baler.

Likewise, in signal contact with the module 10 is a pressing pressure sensor 12. Pressure sensor 12 senses the piston pressure of a pressing piston of the square baler and directs it to the module 10 for evaluating its signals. The module also evaluates the sensor signals of a binding twine load sensor 13, which is preferably embodied as force sensor.

The signals of a straw measuring wheel 14 also are provided to the module 10. Module 10, in addition to the control circuit, also comprises an evaluation unit and which, via its control circuit, controls the throughput of a valve 15 for the pressing pressure of the pressing piston.

Accordingly, at the start of the pressing operation, after the maximum tensile strength of the binding twine has been entered as maximum value in the operating terminal 11 by an operating person, the operating terminals 11 or the module 10 predetermines a so-called standard pressing pressure. The standard pressing pressure is always selected so that neither tearing of the binding twine nor damaging of mechanical press components are accompanied by this pressing operation.

Based on this preset pressing pressure, the module 10, by means of the pressing pressure sensor signals and, based on the signals of the binding twine force sensor 13. controls a valve 15 at a predetermined press meter monitored by the straw measuring wheel sensor 14 to a pressing pressure for the pressing piston of the square baler. This ensures an optimised utilisation of the baler and of the binding twine, without the binding twine and/or the baler being damaged.

Figure 2:
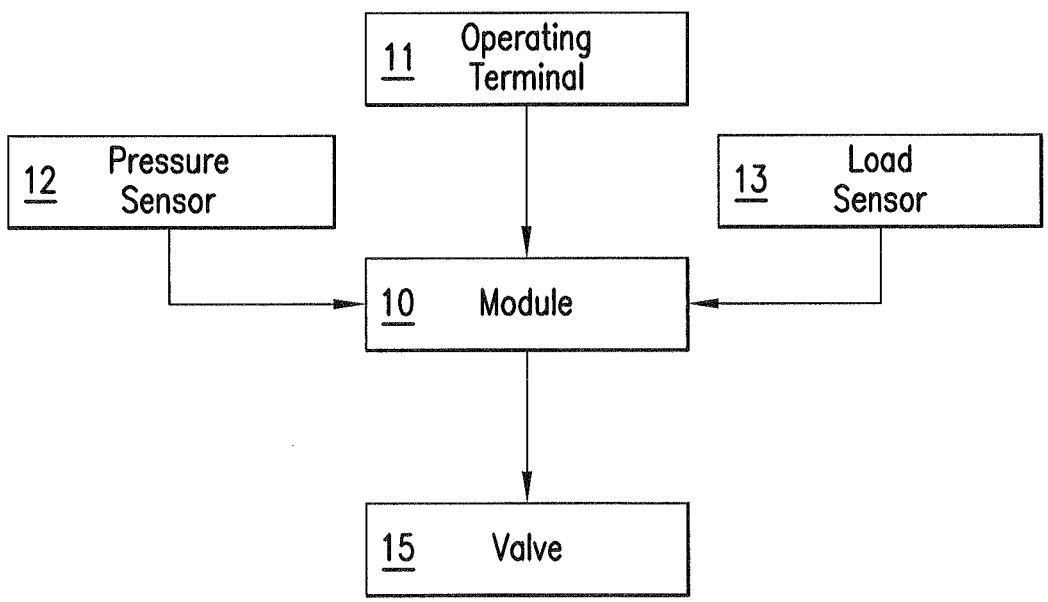
FIG. 2 is a simplified block diagram representation a second embodiment of the method of the invention.

According to FIG. 2, a block diagram for a second embodiment of a pressing pressure regulation for a high-pressure baler is shown that differs from the FIG. 1 embodiment only in that the straw wheel as sensor is omitted.

In view of the fact that present pressing pressure regulation the input signal of the straw wheel is omitted, the standard pressing pressure that manifests itself based on the load input (particularly the input of the maximum tensile strength in the operating terminal 11 on the module 10), is not controlled according to a predetermined number of press meters but instead, immediately after the start of the pressing operation, the pressing pressure is controlled through the control circuit provided in the module 10 for the pressing twine and the square baler with respect to their optimised utilisation.

Figure 3:
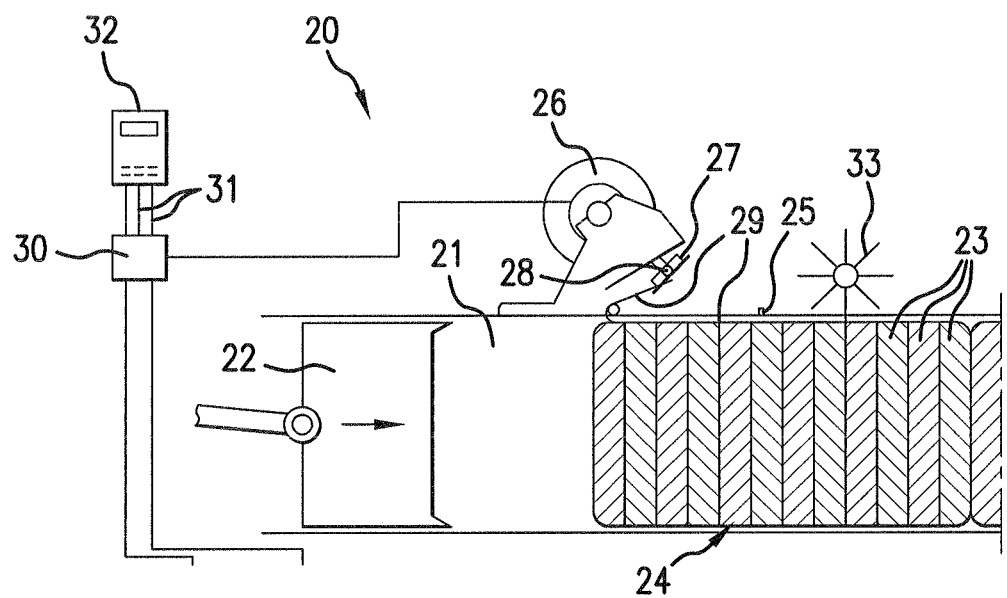
FIG. 3 is a schematic diagram of a square baler according to the invention viewed from the side.

FIG. 3 shows a large square baler 20 with a pressing channel 21 in which, by means of a pressing piston 22 linearly moved therein, the pressing operation of the straw-like crop 23 conveyed via a feeding channel (not shown), is compacted into a square bale 24. After a certain number of charges of the straw-like crop 23, a knotter operation is triggered on a knotter device 26 arranged on an upper wall 25 of the pressing channel 21. For this purpose, the knotter device 26 is provided with a knotter beak 27, on which a force sensor 28 is provided.

The force sensor 28 serves for detecting forces which occur on a binding twine 29 sensed by the knotter beak 27. The forces on the binding twine 29 detected by the force sensor 28 are passed on to a processing electronic device 30 for their further processing, which device in the present case is connected to an operating terminal 32 via lines 31 for the exchange of data. Furthermore, the processing electronic device 30 is connected via a signal line (not shown) to a sensor for sensing the revolutions of a straw measuring wheel 33 (which sensor is not shown in more detail).

At the start of the pressing operation, an operating person sets the maximum load limit, particularly the maximum permissible tensile strength of the binding twine selected for an intended pressing operation on the operating terminal 32. Subsequently, the processing electronic device 30 outputs a so-called standard pressing pressure as preliminary reference variable to a control circuit (not shown in more detail) that is preferably integrated in the module 10 for controlling the pressing pressure.

Once a predetermined number of press metres has been signalled to the processing electronic device 30 by the straw measuring wheel 33, the processing electronic device 30 releases the preset standard pressing pressure and controls the pressing pressure based on the force sensor signals of the binding twine force sensor and the sensor signals of the pressing piston force sensor for the further pressing operations. The pressing pressure, based on the force sensor signals of the force sensors, is then controlled to a quantity which ensures that neither the binding twine nor the square baler, particularly sensitive mechanical components of this baler, are damaged upon a permanent pressing of a straw-like crop.

The following list of reference signs of various elements mentioned above is included (as follows), for ease of explanation:

LIST OF REFERENCE NUMBERS

10=Module
11=Operating terminal
12=Pressing pressure sensor
13=Binding twine load sensor
14=Straw measuring wheel sensor
15=Valve
20=Square baler
21=Pressing channel
22=Pressing piston
23=Crop
24=Bale
25=Upper wall
26=Knotter device
27=Knotter beak
28=Force sensor
29=Binding twine
30=Processing electronic device
31=Lines
32=Operating terminal
33=Straw measuring wheel As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A baler with a pressing chamber which serves for the pressing and compacting a straw-like crop by use of an adjustable pressing pressure and for binding the compacted crop by use of a holding material, comprising:
   a control circuit for controlling the pressing pressure; and
   an operating unit for setting a load characteristic of the holding material;
   wherein a load variable of the holding material that operates as an input value for comparison with a threshold value, defined by a baler-specific maximum load, is fed to an evaluation unit, and
   wherein the evaluation unit compares the input value to the threshold value to generate an output value; and
   wherein the output value is fed to the control circuit as a reference variable for use in limiting the pressing pressure.

2. The baler according to claim 1, wherein the holding material is embodied as binding twine.

3. The baler according to claim 1, wherein the maximum loading of the baler is a maximum tensile strength of the holding material or a deformation resistance of one or a plurality of mechanical components of the baler.

4. The baler according to claim 1, wherein at least one first force sensor is assigned to a knotter device of the baler for detecting a force that occurs on the holding material and wherein at least one second force sensor detects a pressing force of the adjustable pressing pressure.

5. The baler according to claim 4, wherein the at least one first force sensor is assigned to a knotter beak or a knotter frame of the knotter device.

6. The baler according to claim 4, wherein the pressing force of the adjustable pressing pressure comprises a piston pressure of a pressing piston.

7. A baler with a pressing chamber for compacting a straw-like crop by use of an adjustable pressing pressure and for binding the compacted crop by use of a holding material, comprising:
   an operating unit for setting a load characteristic of the holding material;
   a control circuit for receiving the load characteristic as a reference variable and a detected load of the holding material as a feedback variable and outputting an actuating variable representative of the pressing pressure based on the reference variable and the feedback variable; and
   an evaluation unit for receiving the actuating variable and limiting the actuating variable to a predetermined maximum value which reflects a maximum load of the baler.

* * * * *